United States Patent
Furukawa et al.

(10) Patent No.: US 8,446,526 B2
(45) Date of Patent: May 21, 2013

(54) IMAGE DISPLAYING DEVICE AND METHOD, AND IMAGE PROCESSING DEVICE AND METHOD

(75) Inventors: Hiroyuki Furukawa, Iga (JP); Kenichiroh Yamamoto, Chiba (JP); Takashi Yoshii, Chiba (JP); Masafumi Ueno, Ikoma (JP); Yasuhiro Yoshida, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 995 days.

(21) Appl. No.: 12/513,484

(22) PCT Filed: Mar. 12, 2007

(86) PCT No.: PCT/JP2007/054815
§ 371 (c)(1),
(2), (4) Date: May 4, 2009

(87) PCT Pub. No.: WO2008/056451
PCT Pub. Date: May 15, 2008

(65) Prior Publication Data
US 2010/0118185 A1 May 13, 2010

(30) Foreign Application Priority Data
Nov. 7, 2006 (JP) .................................. 2006-301240

(51) Int. Cl.
*H04N 7/01* (2006.01)
(52) U.S. Cl.
USPC .......................................... 348/452; 348/459
(58) Field of Classification Search
USPC .................................................. 348/452, 459
See application file for complete search history.

(56) References Cited

U.S. PATENT DOCUMENTS 4,862,261 A * 8/1989 Tanaka ......................... 348/422.1
5,257,102 A * 10/1993 Wilkinson ..................... 348/441
(Continued)

FOREIGN PATENT DOCUMENTS
EP 1422928 A2 5/2004
EP 1583364 A1 10/2005
(Continued)

OTHER PUBLICATIONS

Ishiguro et al, "Consideration on Motion Picture Quality of the Hold Type Display with an Octuple-rate CRT", Technical Report of IEICE, Institute of Electronics, Information and Communication Engineers, EID96-4, (Jun. 1996), pp. 19-26.

(Continued)

*Primary Examiner* — Sath V Perungavoor
*Assistant Examiner* — Jeffery Williams
(74) *Attorney, Agent, or Firm* — Birch, Stewart, Kolasch & Birch, LLP

(57) ABSTRACT

It is an object to suppress a disturbance or distortion of an insertion image in the vicinity of an effective image edge portion such as an edge portion of a screen or the like caused by a moving compensation type frame rate conversion (FRC). An image processing device is provided with a moving vector detection circuit (2) for detecting a moving vector of an input image signal, an effective image edge portion judging circuit (5) for judging if a moving vector detecting position is adjacent to the effective image edge portion, and a vector switching circuit (3) for switching a vector in accordance with the judging result. The vector switching circuit (3) fixes the vector to 0 vector in the case where the moving vector detecting position is adjacent to the effective image edge portion. In the case where the position is in other region, the vector switching circuit (3) outputs the moving vector detected by the moving vector detection circuit (2) to an insertion vector allocation circuit (4).

8 Claims, 14 Drawing Sheets

U.S. PATENT DOCUMENTS

| | | | |
|---|---|---|---|
| 5,537,155 A * | 7/1996 | O'Connell et al. | 348/699 |
| 5,546,130 A * | 8/1996 | Hackett et al. | 348/459 |
| 5,579,054 A * | 11/1996 | Sezan et al. | 348/452 |
| 5,745,183 A * | 4/1998 | Lam | 375/240.15 |
| 6,108,047 A | 8/2000 | Chen | |
| 6,463,102 B1 * | 10/2002 | Linzer | 375/240.29 |
| 6,728,317 B1 | 4/2004 | Demos | |
| 7,965,898 B2 * | 6/2011 | Diard et al. | 382/239 |
| 2004/0085480 A1 | 5/2004 | Salzer et al. | |
| 2004/0101058 A1 | 5/2004 | Sasai et al. | |
| 2004/0252230 A1 | 12/2004 | Winder | |
| 2004/0252759 A1 * | 12/2004 | Winder et al. | 375/240.12 |
| 2005/0078069 A1 * | 4/2005 | Aiba et al. | 345/87 |

FOREIGN PATENT DOCUMENTS

| | | |
|---|---|---|
| JP | 62-217784 A | 9/1987 |
| JP | 2000-259146 A | 9/2000 |
| JP | 3295437 B2 | 6/2002 |
| JP | 2004-120757 A | 4/2004 |
| JP | 2005-6275 A | 1/2005 |
| JP | 2005-301620 A | 10/2005 |

OTHER PUBLICATIONS

Extended European Search Report, dated Feb. 18, 2013, for European Application No. 07738287.7.

* cited by examiner

FIG. 6
(A)
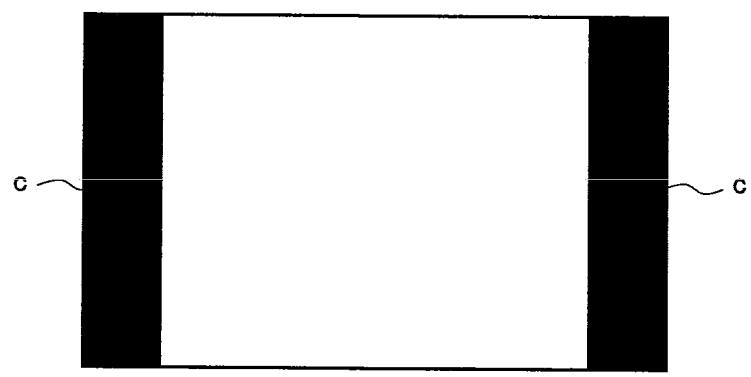
(B)
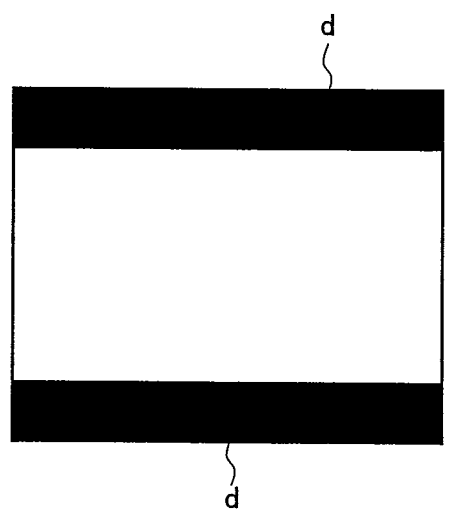

IMAGE DISPLAYING DEVICE AND METHOD, AND IMAGE PROCESSING DEVICE AND METHOD

TECHNICAL FIELD

The present invention relates to an image displaying device and method and an image processing device and method having a function of converting the frame rate or field rate, and, more particularly, to an image displaying device and an image displaying method effected by the image displaying device and an image processing device and an image processing method effected by the image processing device, that prevent any image quality degradation in the vicinity of effective image edges such as screen edges, which may be attributable to a motion compensating rate conversion process.

BACKGROUND OF THE INVENTION

There exist television systems of PAL (Phase Alternation by Line), SECAM (Sequential Couleur A Memoire) system, and NTSC (National Television Committee) system. These broadcasting systems differ in the number of scanning lines (625 lines/50 Hz for PAL and SECAM; 525 lines/60 Hz for NTSC) and in the frame frequency, intrinsically lacking the compatibility there among. Thus, in order to perform international broadcasting, program exchanges, etc., a technique of mutually converting the broadcasting systems has hitherto been developed and used in broadcasting stations, etc. Above all, the frame rate conversion is a process on the time axis and the motion repeatability after the conversion process may have a great influence on the image qualities, resulting in one of the most important techniques among the broadcasting system conversion techniques.

At present, a system conversion device using television digital processing detects and estimates a motion vector of an input image to perform a motion compensation of an interpolation image which is generated in accordance with the output frame rate, thereby carrying out an input/output frame rate conversion process (hereinafter, referred to as motion-compensated frame rate conversion process).

The scheme of the motion-compensated frame rate conversion process is as follows. First, from two or three consecutive images of a plurality of frames of an input image signal, a motion in the images is detected and estimated to obtain a motion vector of the input image (detection of motion vector). Known as this motion vector detection/estimation method are for example a gradient method, a block matching method, and a phase correlation method.

The thus obtained motion vector is then evaluated to select an optimum vector so that the length of the motion vector is adjusted in accordance with the input/output frame rate and that allocation is effected as an interpolation vector on an interpolation frame from the input image (allocation of interpolation vector). An image signal is finally allocated in accordance with the interpolation vector, from newly existing input frames time-axially anterior and posterior on the interpolation frame (generation of interpolation image) to perform frequency conversion of the output frames including the interpolation frame (image interpolation). As above, the input/output frame rate conversion is carried out through the processes comprising roughly of the motion vector detection, the interpolation vector allocation, the interpolation image generation, and the image interpolation.

The above motion-compensated frame rate conversion technique has originally been developed to convert image signals of different broadcasting systems, but recently become used also to improve the motion blur of a hold-type display device represented by a liquid crystal display device. In the hold-type display system, the state of light emission of each pixel is retained during approximately one frame period so that the impulse response of image display light has a time-sequential extension. Therefore, the time frequency characteristics deteriorate, which induces a reduction in the space frequency characteristics, causing a motion blur. That is, since the line of sight of a person smoothly follows a moving object, the image motion looks jerky and unnatural due to the time integral effect when the light emission time is long as in the hold-type display device.

By virtue of a higher frame rate of the input signal achieved by the motion-compensated frame rate conversion technique, the interpolation image signal is formed with a motion compensation so as to be able to improve a reduction in the space frequency characteristics causing a motion blur and to fully improve the motion blur disturbance of the hold-type display system (see, e.g., specification of Japanese Patent No. 3295437; and "Study on Dynamic Image Quality of Hold Emission Type Display by 8* CRT" by Shuichi Ishiguro and Taiichiro Kurita, IEICE Technical Report, The Institute of Electronics, Information and Communication Engineers (IEICE), EID96-4(1196-06), pp. 19-26). Such a technique of converting the frame rate (the number of frames) by interpolating an image between frames to improve the motion blur of the hold-type display device is called FRC (Frame Rate Converter), which has been put in practical use for the liquid crystal display device, etc.

FIG. 1 is a block diagram of a schematic configuration of an FRC drive display circuit in a conventional liquid crystal display device. As shown, the FRC drive display circuit is configured to include an FRC portion 10 that converts the number of frames of an input image signal by interpolating a motion-compensation image signal between frames of the input image signal; an active matrix type liquid crystal display panel 14 having a liquid crystal layer and an electrode for applying a scanning signal and a data signal to the liquid crystal layer; and an electrode driving portion 13 for driving a scanning electrode and a data electrode of the liquid crystal display panel 14 based on the image signal whose frame rate has been converted by the FRC portion 10.

The FRC portion 10 includes a motion vector detecting portion 11 that detects motion vector information from an input image signal, and an interpolation frame generating portion 12 that generates an interpolation frame based on the motion vector information acquired from the motion vector detecting portion 11.

The motion-compensated frame interpolation process is carried out using the motion vector information in this manner to increase the display frame frequency so that the display state of the LCD (hold-type display system) can approximate to the display state of the CRT (impulse type display system), enabling improvement in the image quality degradation attributable to a motion blur which may occur when displaying dynamic images.

Thus, as set forth hereinabove, execution of the motion-compensated frame rate conversion needs detection of a correct motion vector from consecutive front and rear frame images of an input image. The motion vector detection may however become difficult in the vicinity of the screen edges. The reasons therefor will hereinafter be described.

It is considered herein that a motion vector is detected between two frames, i.e., a preceding frame $F_1$ and a current frame $F_2$ of an input image, with the motion detection reference placed on the preceding frame $F_1$. First, when an image enters from the outside of a screen as shown in FIG. 2, a partial image loss is present in the preceding frame $F_1$, which intrinsically means that the motion detection reference is placed on this partial loss area. Therefore, an area indicated by (a) in an interpolation frame $F_{12}$ generated has no interpolation vector allocated thereto and becomes indefinite.

As shown in FIG. 3, when an image leaves toward the outside of the screen, a partial image loss is present in the current frame $F_2$, and hence the vector detection becomes infeasible at an area indicated by (b) in the preceding frame $F_1$.

Thus, in either case, correct detection of the motion vector becomes difficult in the vicinity of the screen edges, so that an interpolation image generated as a result entails a degradation such as a disturbance or a distortion of the image.

By the way, ordinary motion vector detection includes a process of applying a proper filter to the detected motion vector. This is because when the vector detection is carried out on a block-to-block basis, smoothing with peripheral motion vectors to a certain degree will often ensure a visually less image degradation. Execution of such a filtering process may achieve a somewhat desired motion vector in the vicinity of the screen edges.

Nevertheless, one image of the input frame images for use in the interpolation partially lacks in the vicinity of the screen edges, with the result that it is difficult to carry out the same interpolation process as in the other areas (e.g., to perform linear image interpolation from the preceding and following frames in accordance with an interpolation vector), posing a problem also when the interpolation frame is generated.

A technique disclosed in Japanese Laid-Open Patent Publication No. 62-217784 for example is known as measures against the image degradation at the image edges in such the motion-compensated frame rate conversion process. The technique of Japanese Laid-Open Patent Publication No. 62-217784 obviates the problem occurring upon interpolation process among the above problems by adaptively switching to interpolation from only one frame having no partially lost image, i.e., unidirectional interpolation (translation of an input image using the interpolation vector) without performing interpolation from two, preceding and following frames, i.e., bidirectional interpolation (linear interpolation from images at both ends of the motion vector) in the vicinity of the screen edges when generating an interpolation frame image.

DISCLOSURE OF THE INVENTION

Problems to be Solved by the Invention

In spite of successful obviation of the problem upon the interpolation process, however, the above technique described in Japanese Laid-Open Patent Publication No. 62-217784 involves another problem that correct detection itself of the motion vector is intrinsically infeasible in the vicinity of the image edges, resulting in occurrence of disturbance or distortion in the vicinity of the screen edges of the interpolation frame image obtained.

The present invention was conceived in order to solve the above problems and it is therefore the object to provide an image displaying device and method and an image processing device and method, capable of suppressing image quality degradation which may occur in the vicinity of the effective image edges of an interpolation image through a motion-compensated frame rate conversion.

Means for Solving the Problems

A first invention of the present application is an image displaying device comprising a rate converter that interpolates an image signal subjected to a motion compensation process between frames or between fields of an input image signal to convert the number of frames or the number of fields of the input image signal for output to a display panel, the rate converter generating an interpolation image not subjected to the motion compensation process for a predetermined region including edges of an effective image displayed on the display panel, the rate converter generating an interpolation image subjected to the motion compensation process for regions other than the predetermined region.

A second invention of the present application is an image displaying device, wherein the rate converter includes a portion generating an interpolation image signal subjected to a motion compensation process, based on information on motion vectors between consecutive frames or fields contained in the input image signal, and wherein for a predetermined region including edges of an effective image displayed on the display panel, the rate converter invalidates the motion compensation process in the portion for generating an interpolation image signal.

A third invention of the present application is the image displaying device, wherein the rate converter includes a motion vector detecting portion that detects as vector information a motion of an image between consecutive frames or fields contained in the input image signal an interpolation vector allocating portion that allocates an interpolation vector between the frames or between the fields, based on the detected motion vector information an interpolation image generating portion that generates an interpolation image signal from the input image signal, using the allocated interpolation vector; and an image interpolating portion that interpolates the generated interpolation image signal between the frames or between the fields.

A fourth invention of the present application is the image displaying device, wherein the image displaying device invalidates the motion compensation process in either or both of horizontal and vertical directions for the predetermined region by fixing at 0 either or both of horizontal and vertical components of a motion vector in the predetermined region detected by the motion vector detecting portion.

A fifth invention of the present application is the image displaying device, wherein the motion vector is continuously varied at a boundary between the predetermined region and the other regions.

A sixth invention of the present application is the image displaying device, wherein the predetermined region is a region whose width from edges of an effective image is equal to or less than the maximum motion vector length detectable by the motion vector detecting portion.

A seventh invention of the present application is the image displaying device, wherein the image displaying device invalidates the motion compensation process in either or both of horizontal and vertical directions for the predetermined region by fixing at 0 either or both of horizontal and vertical components of an interpolation vector allocated to the predetermined region by the interpolation vector allocating portion.

An eighth invention of the present application is the image displaying device, wherein the interpolation vector is continuously varied at a boundary between the predetermined region and the other regions.

A ninth invention of the present application is the image displaying device, wherein the predetermined region is a region whose width from edges of an effective image is equal to or less than the maximum motion vector length allocatable by the interpolation vector allocating portion.

A tenth invention of the present application is the image displaying device, wherein only a motion compensation process in a vertical direction is invalidated for a predetermined region including top and bottom edges of an effective image displayed on the display panel.

An eleventh invention of the present application is the image displaying device, wherein only a motion compensation process in a horizontal direction is invalidated for a predetermined region including right and left edges of an effective image displayed on the display panel.

A twelfth invention of the present application is an image displaying device, wherein for a predetermined region including edges of an effective image displayed on the display panel, the rate converter interpolates an image signal subjected to a linear interpolation process between frames or between fields of the input image signal.

A thirteenth invention of the present application is the image displaying device, wherein between frames or between fields of the input image signal, the rate converter inserts an image signal of the frames or of the fields for a predetermined region including edges of an effective image displayed on the display panel.

A fourteenth invention of the present application is the image displaying device, wherein the predetermined region is externally variably set.

A fifteenth invention of the present application is the image displaying device, wherein the predetermined region varies depending on a feature amount on the magnitude of a motion of the input image signal.

A sixteenth invention of the present application is the image displaying device, wherein the predetermined region comprises of a region that is constant irrespective of the input image signal and a region disposed inside the invariable region that varies depending on a feature amount on the magnitude of a motion of the input image signal.

A seventeenth invention of the present application is the image displaying device, wherein the region that is constant irrespective of the input image signal is externally variably set.

An eighteenth invention of the present application is the image displaying device, wherein a mean value of motion vectors detected within one frame or within one field, as a reference, is used as the feature amount on the magnitude of a motion of the input image signal.

A nineteenth invention of the present application is the image displaying device, wherein a mean value of interpolation vectors allocated within one frame or within one field, as a reference, is used as the feature amount on the magnitude of a motion of the input image signal.

A twentieth invention of the present application is the image displaying method comprising a rate conversion step of interpolating an image signal subjected to a motion compensation process between frames or between fields of an input image signal to convert the number of frames or the number of fields of the input image signal for output to a display panel, wherein the rate conversion step includes generating an interpolation image not subjected to the motion compensation process for a predetermined region including edges of an effective image displayed on the display panel and generating an interpolation image subjected to the motion compensation process for regions other than the predetermined region.

A twenty-first invention of the present application is the image displaying method, wherein the rate conversion step includes an operation of generating an interpolation image signal subjected to a motion compensation process, based on information on motion vectors between consecutive frames or fields contained in the input image signal, and wherein the motion compensation process in the operation of generating an interpolation image signal is invalidated for a predetermined region including edges of an effective image displayed on the display panel.

A twenty-second invention of the present application is an image displaying method, wherein the rate conversion step includes, for a predetermined region including edges of an effective image displayed on the display panel, interpolating an image signal subjected to a linear interpolation process between frames or between fields of the input image signal.

A twenty-third invention of the present application is an image displaying method, wherein the rate conversion step includes, between frames or between fields of the input image signal, inserting an image signal of the frames or of the fields for a predetermined region including edges of an effective image displayed on the display panel.

A twenty-fourth invention of the present application is an image processing device comprising a rate converter that interpolates an image signal subjected to a motion compensation process between frames or between fields of an input image signal to convert the number of frames or the number of fields of the input image signal, the rate converter generating an interpolation image not subjected to the motion compensation process for a predetermined region including edges in an effective image region of the input image signal, the rate converter generating an interpolation image subjected to the motion compensation process for the other regions.

A twenty-fifth invention of the present application is an image processing device, wherein the rate converter includes a portion generating an interpolation image signal subjected to a motion compensation process, based on information on motion vectors between consecutive frames or fields contained in the input image signal, and wherein for a predetermined region including edges of an effective image displayed on the display panel, the rate converter invalidates the motion compensation process in the portion generating an interpolation image signal.

A twenty-sixth invention of the present application is an image processing device, wherein for a predetermined region including edges of an effective image displayed on the display panel, the rate converter interpolates an image signal subjected to a signal not subjected to the motion compensation process between the frames or between the fields of the input image signal to convert the number of frames or the number of fields of the input image signal, for edges in an effective image region of the input image signal, the image processing device outputting to a display panel an image signal having the number of frames or the number of fields converted by the another rate converter, while for the other regions, outputting to the display panel an image signal having the number of frames or the number of fields converted by the rate converter.

A thirtieth invention of the present application is an image processing device comprising a rate converter that interpolates an image signal subjected to a interpolates an image signal subjected to a linear interpolation process between frames or between fields of the input image signal.

A twenty-seventh invention of the present application is an image processing device, wherein between frames or between fields of the input image signal, the rate converter inserts an image signal of the frames or of the fields for a predetermined region including edges of an effective image displayed on the display panel.

A twenty-eighth invention of the present application is an image processing method comprising a rate conversion step of interpolating an image signal subjected to a motion compensation process between frames or between fields of an input image signal to convert the number of frames or the number of fields of the input image signal, the rate conversion step includes generating an interpolation image not subjected to the motion compensation process for a predetermined region including edges in an effective image region of the input image signal, and generating an interpolation image subjected to the motion compensation process for the other regions.

A twenty-ninth invention of the present application is an image processing method, wherein the rate conversion step includes an operation of generating an interpolation image signal subjected to a motion compensation process, based on information on motion vectors between consecutive frames or fields contained in the input image signal, and wherein the motion compensation process in the operation of generating an interpolation image signal is invalidated for a predetermined region including edges in an effective image region of the input image signal.

A thirtieth invention of the present application is an image processing method, wherein the rate conversion step includes, for a predetermined region including edges in an effective image region of the input image signal, in an effective image region of the input image signal, while applying the motion compensation process to the other regions.

A thirty-third invention of the present application is an image processing method having the step of interpolating an image signal subjected to a linear interpolation process between frames or between fields of the input image signal.

A thirty-first invention of the present application is an image processing method, wherein the rate conversion step includes, between frames or between fields of the input image signal, inserting an image signal of the frames or of the fields for a predetermined region including edges in an effective image region of the input image signal.

A thirty-second invention of the present application is an image displaying device comprising a rate converter that interpolates an image signal subjected to a motion compensation process between frames or between fields of an input image signal to convert the number of frames or the number of fields of the input image signal for output to a display panel, for a predetermined region including edges of an effective image displayed on the display panel, the rate converter reducing the intensity of the motion compensation process, as compared with regions other than the predetermined region.

A thirty-third invention of the present application is an image displaying device, wherein the rate converter comprises an interpolation image generating circuit that generates an interpolation image signal by weighted-adding at a predetermined ratio an image signal subjected to the motion compensation process and an image signal subjected to a linear interpolation process, and wherein for the predetermined region including edges of the effective image displayed on the display panel, the image displaying device increases the weighted-addition ratio of the image signal subjected to the linear interpolation process.

A thirty-fourth invention of the present application is an image displaying device, wherein for the predetermined region including edges of the effective image displayed on the display panel, the interpolation image generating portion uses the image signal subjected to the linear interpolation process as the interpolation image signal, and wherein for the other regions, the interpolation image generating portion uses the image signal subjected to the motion compensation process as the interpolation image signal.

A thirty-fifth invention of the present application is an image displaying device, wherein the predetermined region varies depending on a feature amount on the magnitude of a motion of the input image signal.

A thirty-sixth invention of the present application is an image displaying device, wherein the predetermined region is externally variably set.

A thirty-seventh invention of the present application is an image displaying method comprising the step of interpolating an image signal subjected to a motion compensation process between frames or between fields of an input image signal to convert the number of frames or the number of fields of the input image signal for output to a display panel, wherein for a predetermined region including edges of an effective image displayed on the display panel, the intensity of the motion compensation process is reduced as compared with regions other than the predetermined region.

A thirty-eighth invention of the present application is an image processing device comprising a rate converter that interpolates an image signal subjected to a motion compensation process between frames or between fields of an input image signal to convert the number of frames or the number of fields of the input image signal, for a predetermined region including edges in an effective image region of the input image signal, the rate converter reducing the intensity of the motion compensation process, as compared with the other regions.

A thirty-ninth invention of the present application is an image processing method comprising the step of interpolating an image signal subjected to a motion compensation process between frames or between fields of an input image signal to convert the number of frames or the number of fields of the input image signal, wherein for a predetermined region including edges in an effective as compared with the other regions.

Effect of the Invention

According to the present invention, the motion-compensated interpolation process is not partly applied to predetermined regions including effective image edges, to thereby enable image quality degradation in the vicinity of the edges of the effective image to effectively be suppressed.

BRIEF DESCRIPTION OF THE DRAWINGS

FIG. 6 is a diagram for explaining a case where an effective image and a display screen have different aspect ratios.

EXPLANATIONS OF REFERENCE NUMERALS

Figure 1:
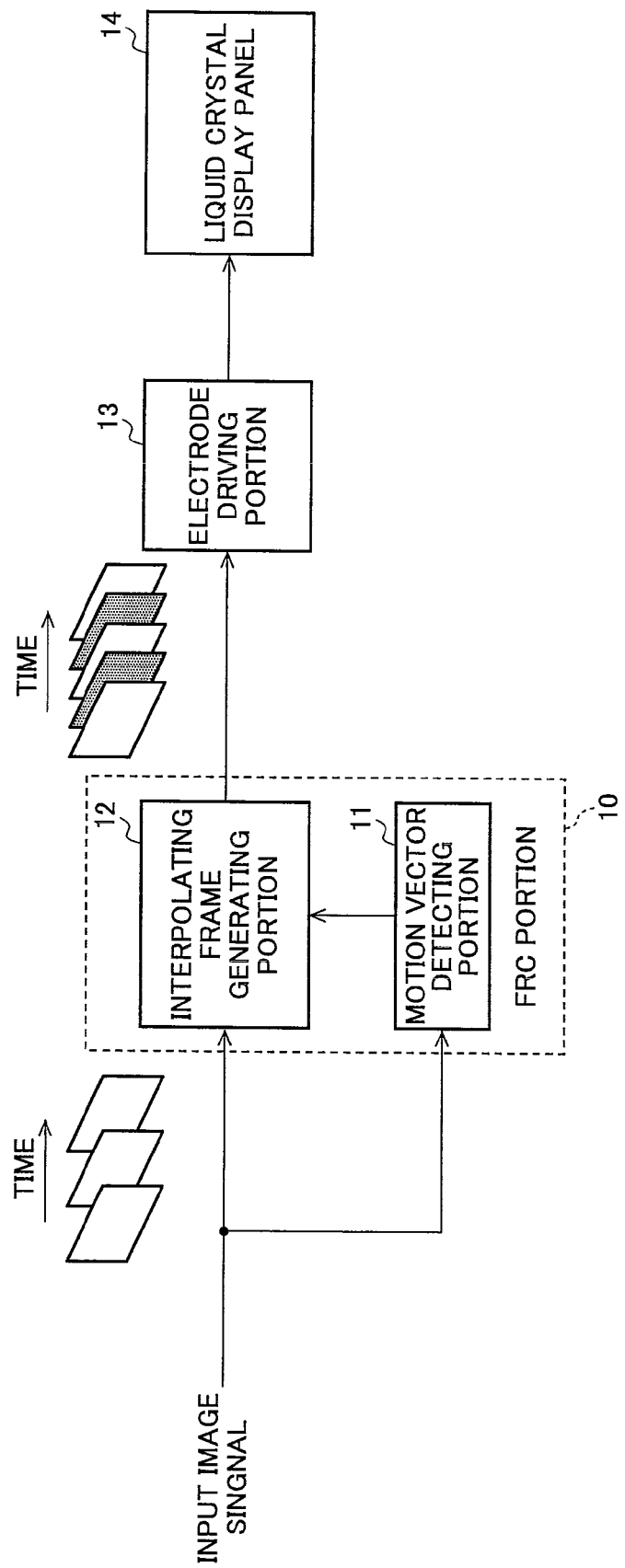
FIG. 1 is a block diagram of a schematic configuration of an FRC drive display circuit in a conventional liquid crystal display device.
Figure 2:
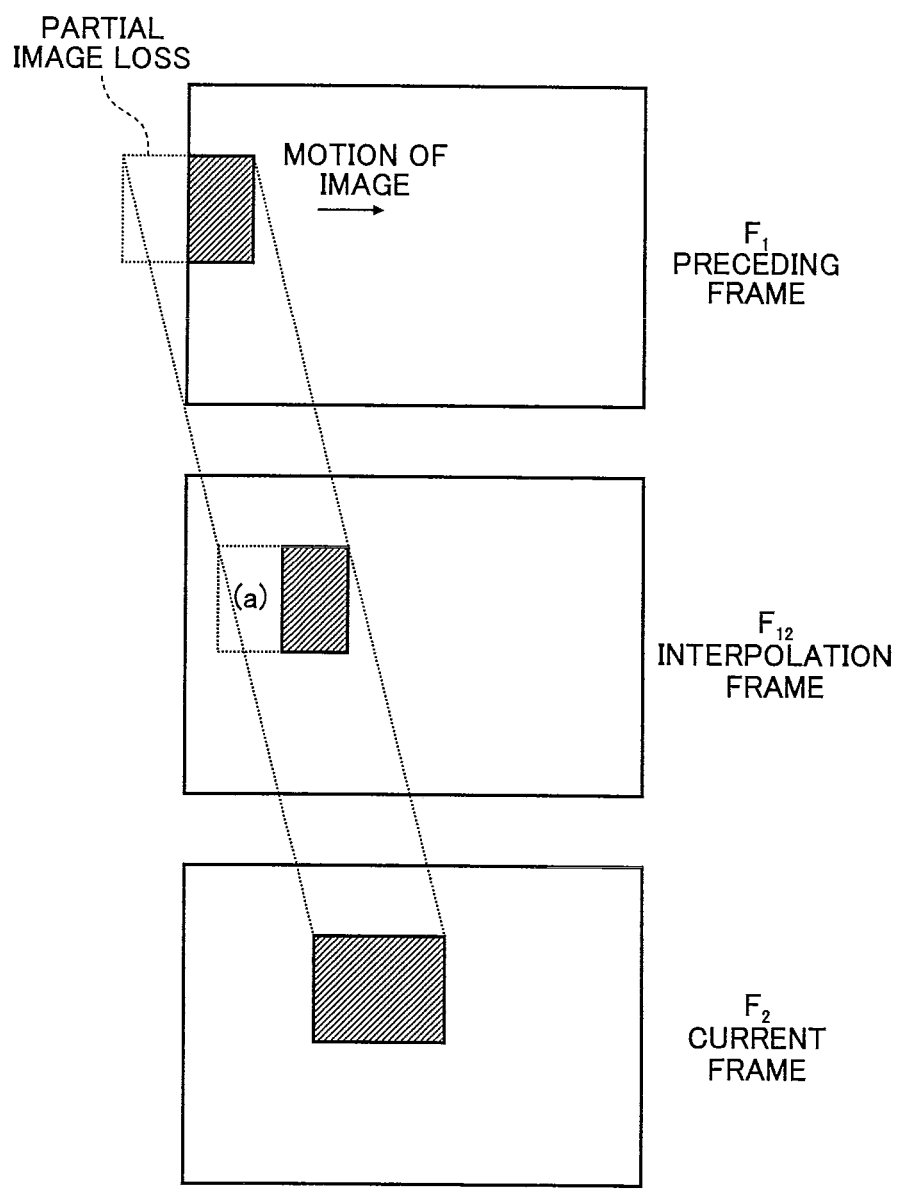
FIG. 2 is a diagram for explaining a problem of motion vector detection in the vicinity of screen edges when an image enters from the outside of a screen.
Figure 3:
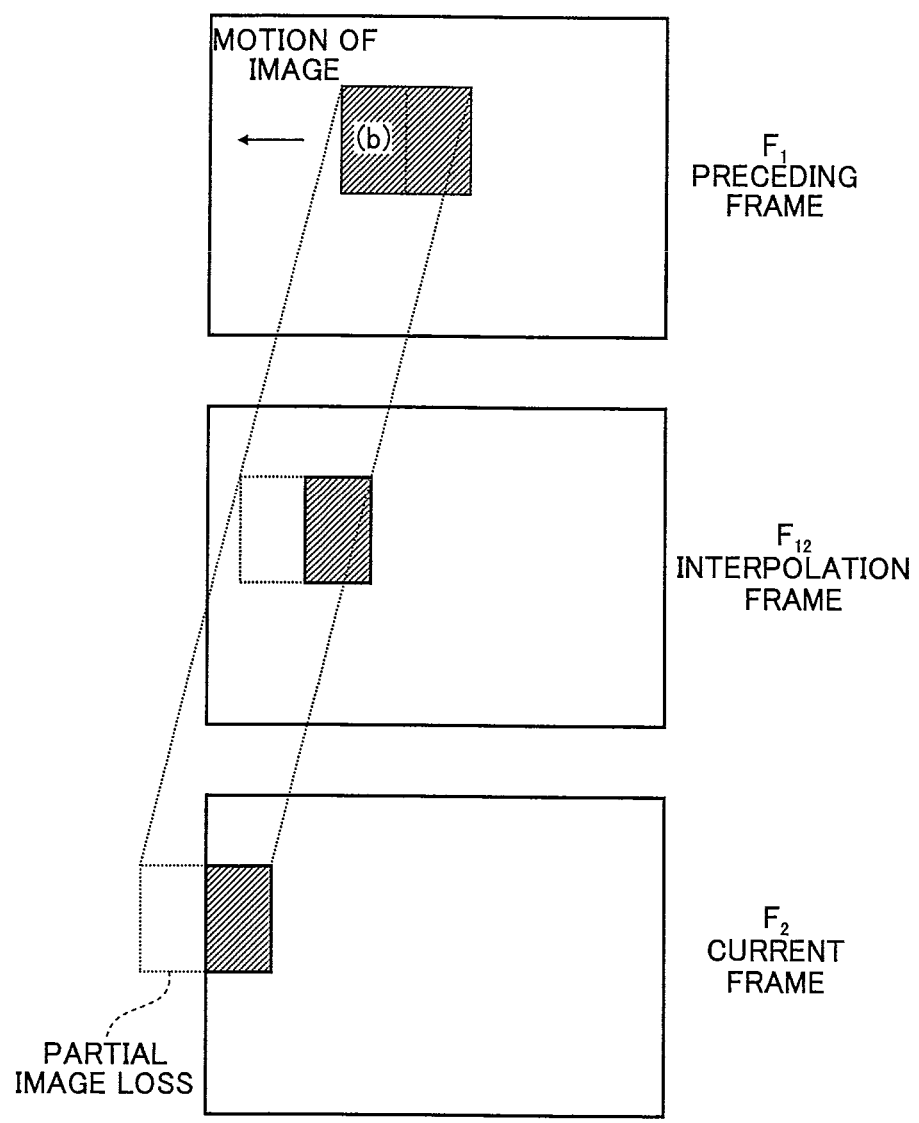
FIG. 3 is a diagram for explaining a problem of the motion vector detection in the vicinity of the screen edges when an image leaves toward the outside of the screen.

1 ... frame memory for motion detection
2 ... motion vector detecting circuit
3 ... vector switching circuit
4 ... interpolation vector allocating circuit
5 ... effective image edge determining circuit
6 ... interpolation vector memory
7 ... frame memory for interpolation image generation
8 ... interpolation image generating circuit
9 ... image interpolating circuit
10 ... frame rate converter (FRC) portion
11 ... vector detecting portion
12 ... frame generating portion
13 ... electrode driving portion
14 ... liquid crystal display panel
15 ... switching portion
21 ... path
22 ... linear-interpolation interpolating process portion
23 ... memory
31 ... compensation intensity varying portion

PREFERRED EMBODIMENTS OF THE INVENTION

Preferred embodiments of an image displaying device of the present invention will now be described with reference to the accompanying drawings. It is to be noted that the present invention is applicable to both of a field signal and interpolated field signal and a frame signal and interpolation frame signal, but that since the both (field and frame) have a similar relationship, the frame signal and interpolation frame signal will be described as a typical example.
(First Embodiment)

A first embodiment of the present invention includes compulsorily nullifying either or both of vertical and horizontal components of a motion vector detected by a motion vector detecting portion in order to invalidate either or both of vertical and horizontal motion compensation processes in an FRC portion 10 for predetermined regions including top and bottom edges or right and left edges of an effective image displayed on a display panel.

Figure 4:
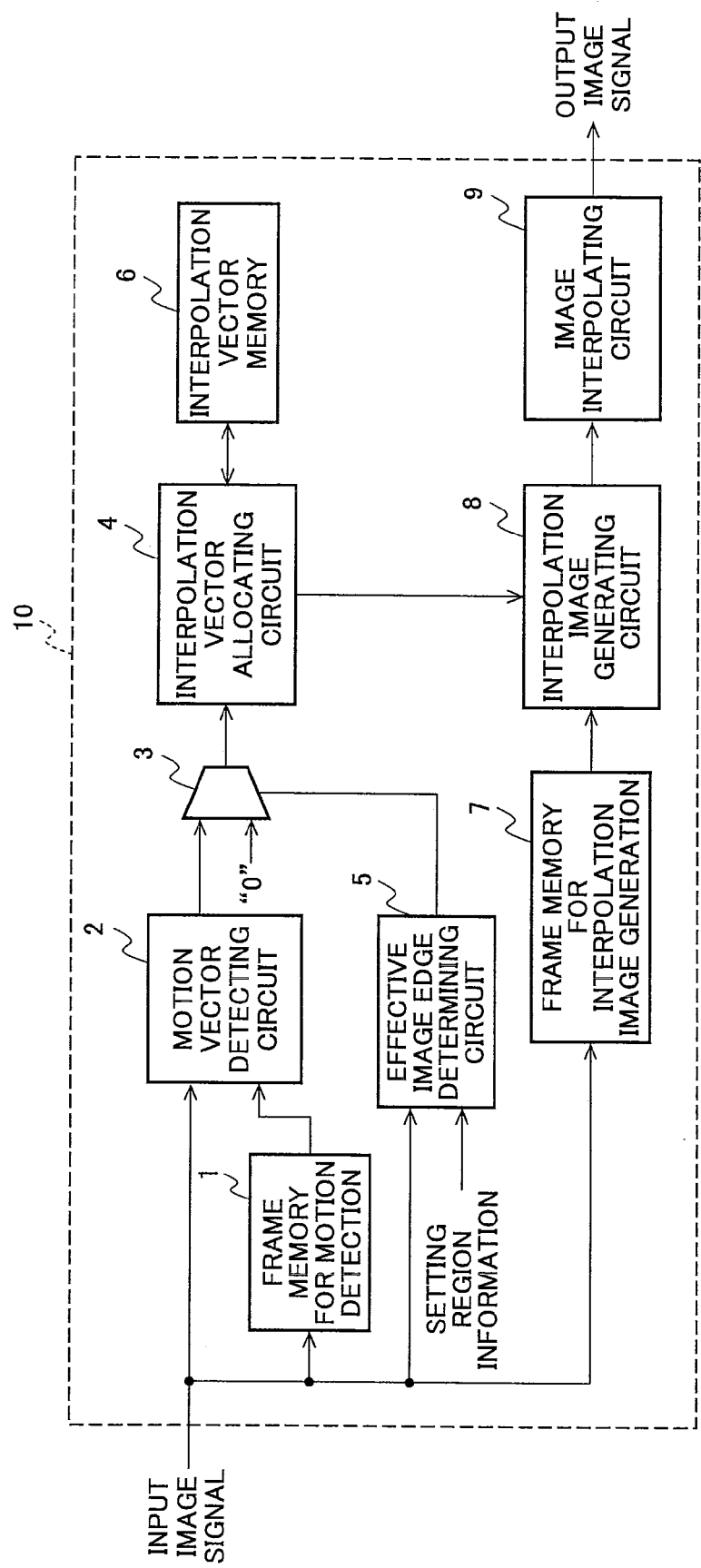
FIG. 4 is a block diagram of an essential part configuration example of a frame rate converting portion disposed in an image displaying device according to a first embodiment of the present invention.

FIG. 4 is a block diagram of a configuration example of the FRC portion 10 included in the image displaying device of this embodiment. In this embodiment, description will be given of a case of detecting a motion vector from an input image of two consecutive frames, i.e., preceding and current frames, to generate an interpolation image. The motion vector detection is carried out on a block-to-block basis, with a detection reference block placed on the preceding frame of the input image.

In general, a dynamic image has a high interframe correlation and a continuity in the time axis direction, and hence a pixel or a block moving in a frame often moves with the same amount of motion in the following frame or in the preceding frame. Namely, the motion vector often has a continuity between consecutive frames.

This enables the motion vector detection in the next frame to easier or more correctly be done by referring the result of motion vector detection in the precedent frame. For example, in an iterative gradient method that is an improved gradient method, operations of the gradient method are iterated starting with an initial displacement vector that is a motion vector of nearby blocks already detected in the preceding frame or current frame with respect to the detection reference block. According to this method, about twice iteration of the gradient method will ensure acquisition of a substantially correct motion vector.

The block matching method may also be used to perform an effective detection of a motion vector through e.g., changing the order of search referring to the result of motion vector detection in the preceding frame.

In FIG. 4, reference numeral 1 denotes a frame memory for motion detection that stores and delays an input image signal by one frame for the output as preceding frame data. The preceding frame data output from the frame memory 1 for motion detection enters a motion vector detecting circuit 2 together with an input image signal of the current frame.

The motion vector detecting circuit 2 detects a motion vector of an image through e.g., the gradient method or the block matching method, based on input two-frame image data. The detected motion vector is output to an interpolation vector allocating circuit 4 via a vector switching circuit 3.

The motion vector detected by the motion vector detecting circuit 2 employs a detection block on the preceding frame as its reference, so that, if left as it is, there may occur cases where no vector exists on the interpolation frame or where allocation of a plurality of vectors is carried out. Therefore, the interpolation vector allocating circuit 4 performs smoothing with peripheral vectors and vector evaluation based on the input motion vector to re-create an interpolation vector whose reference is on top of the interpolation frame. This eliminates the absence or duplication of vectors on the interpolation frame.

Figure 5:
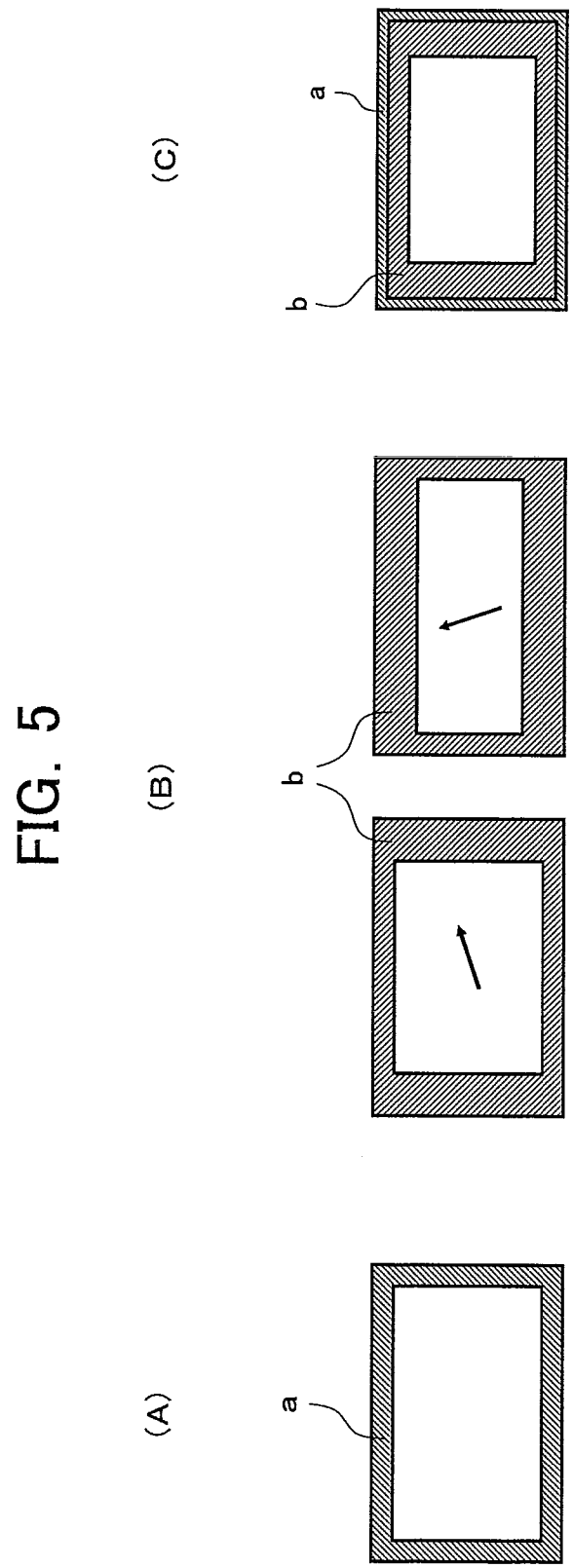
FIG. 5 is an explanatory view of a screen edge region that is determined by an effective image edge determining circuit disposed in the image displaying device according to the first embodiment of the present invention.

An effective image edge determining circuit 5 determines regions of edges of an effective image (edges of a display screen in this case), based on setting region information externally set and input and on a synchronous signal contained in the input image signal. The setting region may be for example a region a (hatched zone) having a certain width from the top and bottom edges and right and left edges of the display screen, as shown in FIG. 5(A). The length of the motion vector is usually limited to the vector search range for the purpose of suppressing the circuit scale. Hence, this setting region a is to be defined having a width from the screen edges equal to or less than the upper limit of the motion vector length detectable by the motion vector detecting circuit 2.

A vector having a length of 0 (no amount of motion) is allocated through the vector switching circuit 3 to a region determined to be in the vicinity of the edges of the effective image by the effective image edge determining circuit 5.

Since the interpolation vector allocating circuit 4 applies the filtering process to an input motion vector as described hereinabove, an abrupt change of the vector can be avoided at the boundary between the edge vicinity region of the effective image where the vector is fixed at 0 and the other regions subjected to ordinary motion vector detection. In other words, a continuous change in the motion vector becomes feasible at the boundary between the edge vicinity region of the effective image and the other regions thereof.

An interpolation vector generated for each allocation unit by the interpolation vector allocating circuit 4 is stored for one frame in an interpolation vector memory 6. A frame memory 7 for interpolation image generation stores therein input image data required to generate an interpolation image.

An interpolation image generating circuit 8 then reads out in sequence interpolation vectors stored in the interpolation vector memory 6 and, in conformity with screen coordinates information designated by the read-out interpolation vector, reads out images data from the frame memory 7 for interpolation image generation. At this time, the interpolation vector is fixed at zero vector in the edge vicinity region of the effective image so that disturbance-free interpolation is performed on the effective image edges as well, irrespective of the image motions.

The interpolation image generation of this embodiment may employ either the system (bidirectional interpolation) using two, preceding and following input frame images or the system (unidirectional interpolation) using designated one, preceding or following input frame image.

An interpolation frame image generated by an interpolation image generating circuit 8 is finally converted to the output frame rate by an image interpolating circuit 9 and then properly switched to and from the input image signal, for output. The above series of processes can achieve the motion-compensated frame rate conversion free from any image disturbance or distortion even in the vicinity of the effective image edges such as screen edges.

By the way, for a relatively local small motion in the vicinity of the screen edges, the motion vector of 0 has only to be applied to the region a having a certain width from the screen edges as set forth hereinabove with reference to FIG. 5(A). In order to deal with images where the whole screen moves to a large extent such as images taken by high-speed camera panning, however, the setting region has to extend largely up to the upper limit of the motion vector length. Inconveniently, this region is not subjected to the motion compensation, with the result that dynamic image quality improvement effect through the frame rate conversion cannot be expected for ordinary images free from occurrence of high-speed panning, etc. It is therefore desirable that the setting region having the motion vector fixed at 0 be not too large.

Thus, the above problem can be dealt with by applying, as a screen edge region, for each frame, a region b where the width from the screen edges varies depending on the feature amount of motion of the whole image within one frame as shown in FIG. 5(B). This feature amount of motion of the whole image within one frame can be, for example, a mean value of all the motion vectors and interpolation vector for one frame. By elongating this of the order of one to two times prior to the screen edge region setting, it becomes possible to deal with any local image motions in the vicinity of the screen edges.

A similar effect can be obtained by combining a region a and a region b as shown in FIG. 5(C), the region a being set to have a certain small width from the screen edges irrespective of the input image signal, the region b being set inside the region a to have a width that depends on the feature amount of the motion of the input image signal.

Although the motion vector detection often becomes incorrect in the vicinity of the screen edges, correct detection is feasible if limited to the right to left (horizontal) motion in the vicinity of the screen top and bottom edges.

Similarly, detection is feasible even in the vicinity of the screen right and left edges if the motion is limited to the top to bottom (vertical direction) motion. Thus, to acquire a better interpolation image, the vector switching circuit 3 acts to independently switch top to bottom components and right to left components of the motion vector such that only the top to bottom component of the motion vector is 0 for a region provided in the vicinity of the top and bottom edges of the screen, of setting regions shown in FIGS. 5(A) to 5(C) and that only the right to left component of the motion vector is 0 for a region provided in the vicinity of the right and left edges.

The above description presupposes that an image is displayed throughout the whole surface of the display panel disposed in the image displaying device and that the display screen edges coincide with the effective image edges. In the case, for example, where a picture with a 4:3 aspect ratio is displayed on the display device provided having a 16:9 display screen, however, a still image region such as a black frame c irrelevant to the effective image may be added to the right and left of the original image (effective image) regions as shown in FIG. 6(A), with the result that the effective image edges and the display screen edges become uncoincident with each other.

In the case of displaying 16:9 picture by a display device having a 4:3 display screen for example, a black frame d, etc., may be added to the top and bottom of the original image (effective image) regions as shown in FIG. 6(B). As in the above, in such a case where a still image such as a monochromatic frame is displayed at the screen edges with the effective image edges becoming uncoincident with the screen edges, the detection and addition of this monochromic frame is effected by a video processor (not shown) disposed anterior to the FRC portion 10. Therefore, images having monochromic frames added thereto can also be dealt with by for example accepting monochromatic frame information from this video processor and operating the effective image edge determining circuit 5.

As set forth hereinabove, the image displaying device of this embodiment invalidates the motion compensation process by fixing at 0 either or both of the vertical and horizontal components of a motion vector in predetermined regions including top and bottom edges or right and left edges of the effective image displayed on the display panel to thereby effectively suppress the image quality degradation in the vicinity of the effective image edges, whereas it applies the motion compensation processes to the other regions to thereby improve the dynamic image quality.

Although in the above first embodiment, description has been made of one fixing at 0 the motion vectors detected in predetermined regions in the vicinity of the effect image edges, a similar effect can be obtained by nullifying the interpolation vector allocated to the edge vicinity regions of the effective image on the interpolation frame. This will then be described as a second embodiment of the present invention, in which the same portions as those of the first embodiment are denoted by the same reference numerals and will not again be described.

(Second Embodiment)

A second embodiment of the present invention includes compulsorily nullifying either or both of vertical and horizontal components of an interpolation vector allocated by an interpolation vector allocating portion, in order to invalidate the vertical or horizontal motion compensation processes of the FRC portion 10 for predetermined regions including top and bottom edges or right and left edges of an effective image displayed on the display panel.

Figure 7:
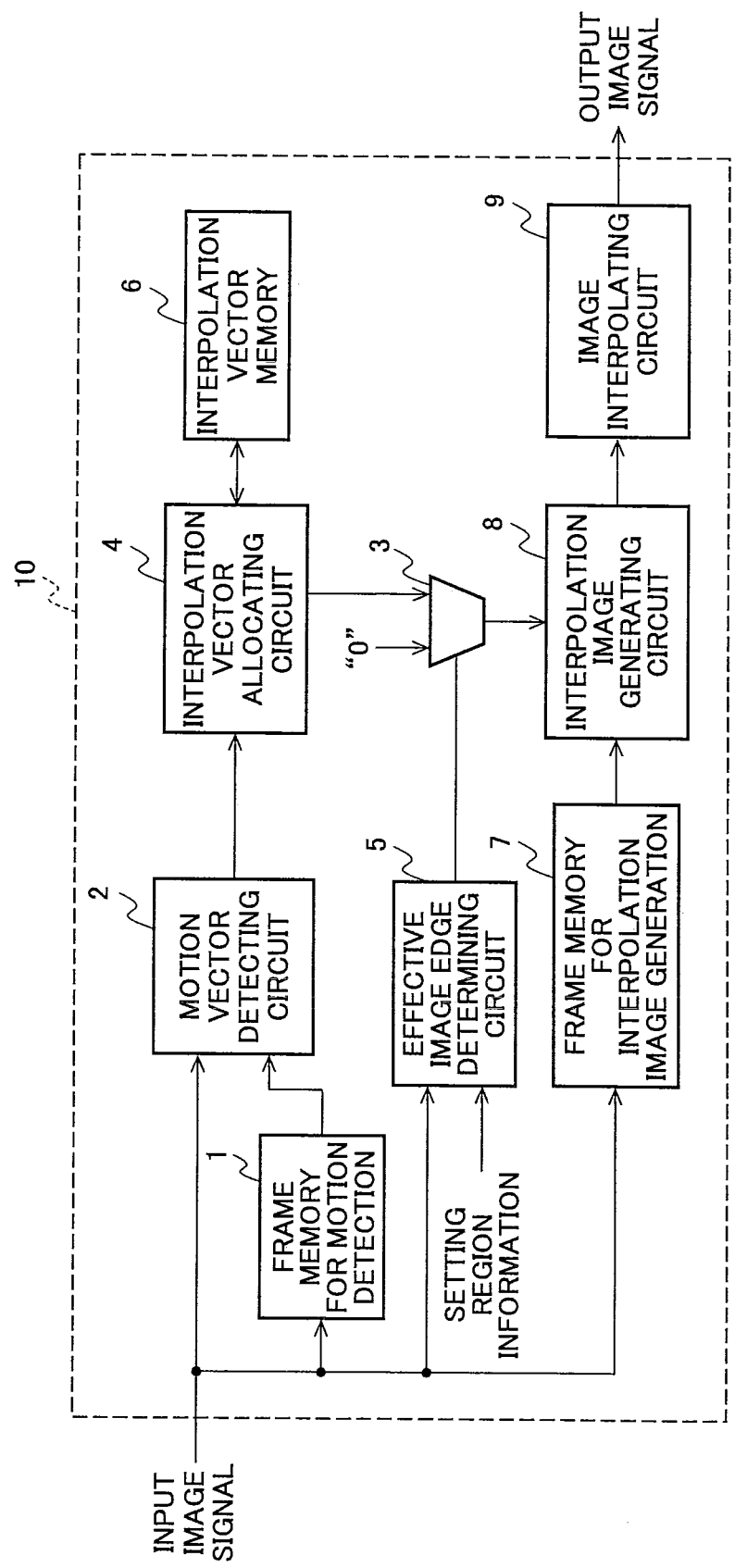
FIG. 7 is a block diagram of an essential part configuration example of an image displaying device according to a second embodiment of the present invention.

FIG. 7 is a block diagram of a configuration example of the FRC portion 10 disposed in the image displaying device of this embodiment. In this embodiment, as shown in FIG. 7, the vector switching circuit 3 is provided that fixedly switches to 0 the interpolation vector output from the interpolation vector allocating circuit 4, depending on the result of determination made by the effective image edge determining circuit 5.

That is, for output to the interpolation image generating circuit 8, the vector switching circuit 3 allocates a vector whose vertical and/or horizontal components are 0 in length (no amount of motion) to a region determined to be in the vicinity of the top and bottom edges or right and left edges of the effective image by the effective image edge determining circuit 5. Note that the setting region to be determined as effective image edges by the effective image edge determining circuit 5 has a width from the screen edges equal to or less than the maximum interpolation vector length allocatable by the interpolation vector allocating circuit 4.

In this configuration, due to the interpolation vector directly fixed at 0, the presence or absence of the motion compensation is definite at the boundary between the edge vicinity regions and the other regions of the effective image. It is therefore desirable that the filtering process be placed after the vector switching so as to ensure a smooth change in the interpolation vector at the boundary between the edge vicinity regions and the other regions of the effective image.

Thus, for predetermined regions including the top and bottom edges or the right and left edges of the effective image displayed on the display panel, the vertical and/or horizontal components of the interpolation vector are fixed at 0 to invalidate the motion compensation process so that the image quality degradation in the vicinity of the edges of the effective image can effectively be suppressed, whereas the other regions are subjected to the motion compensation process, enabling the dynamic image quality to be improved.

(Third Embodiment)

In a third embodiment of the present invention, a linear-interpolation interpolating process portion is provided on a path different from an input path to the FRC portion 10 to switch to the linear-interpolation interpolating process portion for predetermined regions including edges of an effective image displayed on the display panel so that a linear-interpolated image signal is interpolated only on these predetermined regions. That is, for the predetermined regions including the edges of the effective image, switching is made so as to perform the frame rate conversion through execution of the linear interpolation process instead of executing the motion-compensated interpolation process by the FRC portion 10. The following is a description thereof in which the same portions as those in the first embodiment are designated by the same reference numerals and will not again be described.

Figure 8:
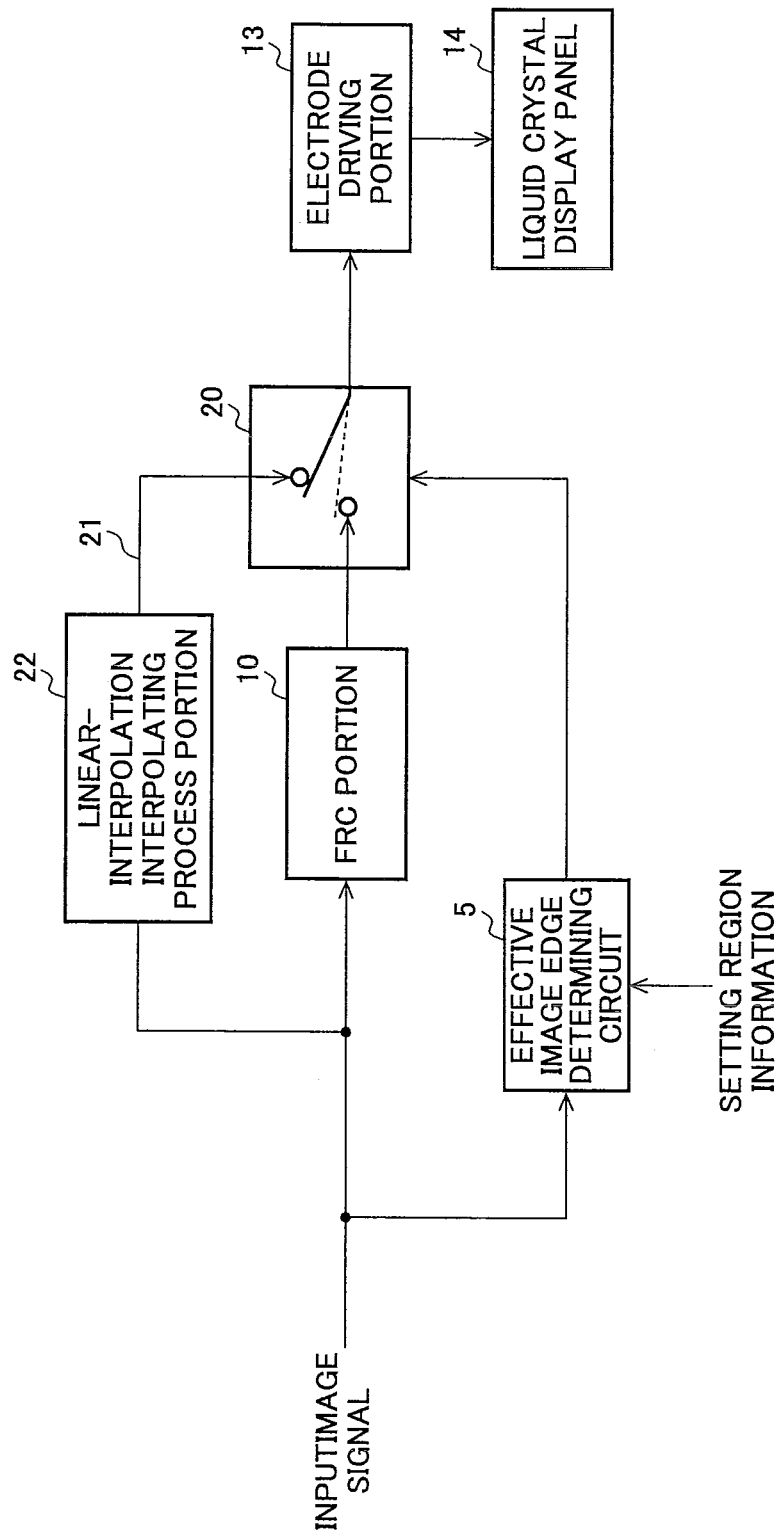
FIG. 8 is a block diagram of an essential part configuration example of an image displaying device according to a third embodiment of the present invention.

FIG. 8 is a block diagram of an essential part configuration example of an image displaying device according to a third embodiment of the present invention, the image displaying device being configured to include the FRC portion 10, the effective image edge determining circuit 5, a switching portion 20, an electrode driving portion 13, the liquid crystal display panel 14, a path 21 disposed separately from the input path to the FRC portion 10, and a linear-interpolation interpolating process portion 22 disposed on the path 21. The switching portion 20 is disposed posterior to the FRC portion 10 to switch images as its output, in accordance with the result of determination of the effective image edge determining circuit 5, between an image signal motion-compensation interpolated by the FRC portion 10 and an image signal linear-interpolation interpolated by the linear interpolation interpolated process portion 22.

That is, for regions determined to be in the vicinity of the edges of the effective image by the effective image edge determining circuit 5, the switching portion 20 switches to the path 21 (to the linear-interpolation interpolating process portion 22) to output to the electrode driving portion 13 an output image signal generated by interpolating an image signal subjected to the linear interpolation process between frames of an input image signal. For the regions other than the edge vicinities of the effective image, the switching portion 20 switches to the path to the FRC 10 to output to the electrode driving portion 13 an output image signal generated by interpolating an image signal subjected to the motion compensation process between the frames of the input image signal.

The linear interpolation process serves to acquire an interpolation frame through the linear interpolation with a frame interpolation ratio α from the preceding frame signal and the current frame signal. Therefore, this embodiment achieves a similar effect to the case of executing the bidirectional interpolation with the motion vector/interpolation vector fixed at 0 in the edge vicinity regions of the effective image in the first and second embodiments.

Thus, the predetermined regions including edges of the effective image displayed on the display panel do not undergo the motion compensation process so that the image quality degradation can effectively be suppressed in the vicinity of the edges of the effective image, whereas the other regions undergoes the motion compensation process, enabling the dynamic image quality to be improved.

(Fourth Embodiment)

In a fourth embodiment of the present invention, a memory is disposed on a path different from the input path to the FRC portion 10 so that switching is made to the memory for predetermined regions including edges of an effective image displayed on the display panel and that image signals of the same frame are iteratively read out plural times at a high speed from the memory only for the predetermined regions to perform the frame rate conversion. That is, switching is made such that to the predetermined regions including the edges of the effective image the motion-compensated interpolation process is not applied but instead the input image signals are consecutively output at high speed for the frame rate conversion. The following is a description thereof, in which the same portions as those in the first embodiment are designated by the same reference numerals and will not again be described.

Figure 9:
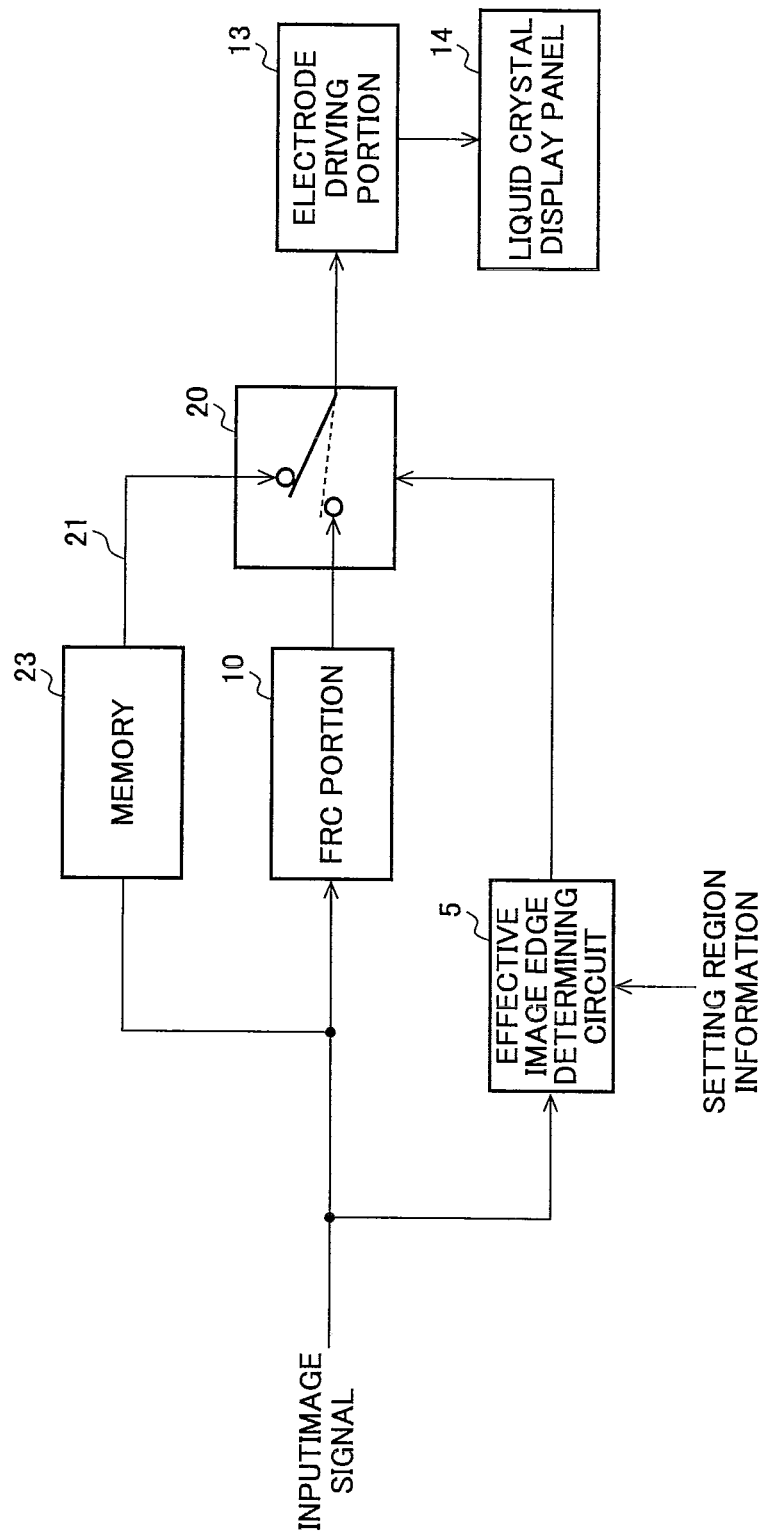
FIG. 9 is a block diagram of an essential part configuration example of an image displaying device according to a fourth embodiment of the present invention.

FIG. 9 is a block diagram of an essential part configuration example of an image displaying device according to a fourth embodiment of the present invention, the image displaying device being configured to include the FRC portion 10, the effective image edge determining circuit 5, the switching portion 20, the electrode driving portion 13, the liquid crystal display panel 14, the path 21 disposed separately from the input path to the FRC portion 10, and a memory 23 disposed on the path 21. The switching portion 20 is disposed posterior to the FRC portion 10 to switch images as its output, in accordance with the result of determination of the effective image edge determining circuit 5, between an image signal motion-compensation interpolated by the FRC portion 10 and an image signal of the preceding frame or of the following frame from the memory 23.

That is, for regions determined to be in the vicinity of the edges of the effective image by the effective image edge determining circuit 5, the switching portion 20 switches to the path 21 (to the memory 23) to output to the electrode driving portion 13 an output image signal generated by interpolating, between frames of the input image signal, image signals of the preceding or following frame iteratively read out from the memory 23. For the regions other than the edge vicinities of the effective image, the switching portion 20 switches to the path to the FRC 10 to output to the electrode driving portion 13 an output image signal generated by interpolating an image signal subjected to the motion compensation process between the frames of the input image signal.

When the frame rate conversion is performed by iteratively outputting image signals of the same frame at a high speed for the edge vicinity regions of the effective image as in this embodiment, a similar effect can be achieved so that in the case where the unidirectional interpolation is carried out with the motion vector/interpolation vector fixed at 0 in the edge vicinity regions of the effective image in the first and second embodiments.

Thus, the predetermined regions including edges of the effective image displayed on the display panel do not undergo the motion compensation process so that the image quality degradation can effectively be suppressed in the vicinity of the edges of the effective image, whereas the other regions undergoes the motion compensation process, enabling the dynamic image quality to be improved.

(Fifth Embodiment)

A fifth embodiment is configured to vary the intensity of the motion compensation process in the interpolation image generating circuit 8 for predetermined regions including edges of an effective image displayed on the display panel. Specifically, the interpolation image generating portion is provided to generate an interpolation frame by weighted addition in a predetermined ratio of an image signal subjected to the motion compensation process and an image signal subjected to the linear interpolation process, with the weighted addition ratio being varied for the edge vicinities of the effective image. The following is a description thereof in which the same portions as those in the first embodiment are designated by the same reference numerals and will not again be described.

Figure 10:
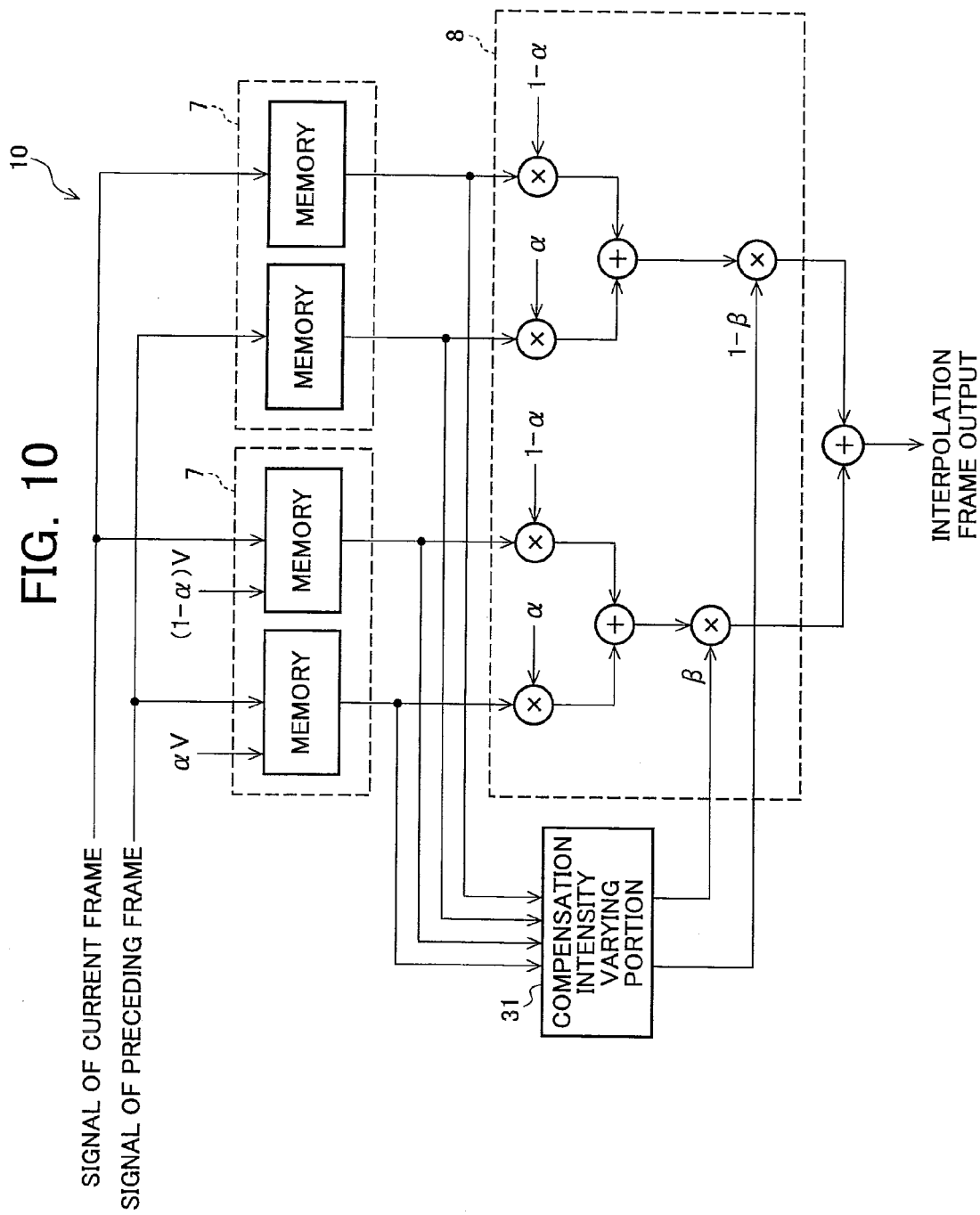
FIG. 10 is a block diagram of an essential part configuration example of a frame rate converter portion disposed in an image displaying device according to a fifth embodiment of the present invention.

FIG. 10 is a block diagram of an essential part configuration example of the FRC portion 10 according to a fifth embodiment of the present invention, the FRC portion being configured to include the frame memory 7 for interpolation image generation, the interpolation image generating circuit 8, and a compensation intensity varying portion 31 that varies the intensity of the motion compensation process in the FRC portion 10. In the diagram, V denotes an interpolation vector, α denotes a frame interpolation ratio, and β denotes a motion compensation intensity (weighted addition ratio).

In general, known as methods of frame interpolation process are for example the frame interpolation based on the linear interpolation between two frames and the frame interpolation (motion-compensated interpolation) using the motion vector. In the former, an interpolation frame is acquired by performing the linear interpolation with a frame interpolation ratio α from a signal of the preceding frame and a signal from the current frame. Therefore, use of this linear interpolation can prevent the image quality degradation attributable to a motion-compensated interpolation error.

On the other hand, in the latter, an interpolation vector V is detected from a motion vector between an image of the preceding frame and an image of the current frame in order to acquire an interpolation frame from the preceding frame and the current frame, and weighted addition is performed of a signal obtained by shifting the image of the preceding frame by αV as a result of partitioning the value (interpolation vector V) with the frame interpolation ratio α and a signal obtained by shifting the image of the current frame by (1−α) V, to thereby acquire the interpolation frame.

Accordingly, in this embodiment, the compensation intensity varying portion 31 is provided in the interpolation image generating circuit 8. This compensation intensity varying portion 31 varies the weighted addition ratio β for regions determined to be in the vicinity of edges of an effective image by the effective image edge determining circuit 5. This weighted addition ratio β is a ratio used when weighted-adding an image signal subjected to the motion compensation process and an image signal subjected to the linear interpolation process. The interpolation image generating circuit 8 of this embodiment weighted-adds the linear-interpolation interpolation image and the motion-compensated interpolation image in accordance with this weighted addition ratio β, to thereby generate an interpolation frame.

For example, the compensation intensity varying portion 31 sets the weighted addition ratio β at 0 for the edge vicinity regions of the effective image to use the image signal subjected to the linear interpolation process as the interpolation frame to prevent the image quality degradation arising from a motion compensation error. On the other hand, the weighted addition ratio β is set at 1 for regions other than the edge vicinity regions of the effective image, and the image signal subjected to the motion compensation process is used as the interpolation frame to achieve better dynamic image quality.

Since the weighted addition ratio β can arbitrarily variably be set, it may be set at an approximately intermediate value between 0 and 1. Thereby, control can be provided so as to suppress the image quality degradation arising from a motion compensation error while simultaneously performing the motion compensation in the interpolation frame image, making it possible to properly improve both the image quality degradation induced by a motion blur and the image quality degradation induced by a motion compensation error. Furthermore, by continuously varying the value of the weighted addition ratio β between 0 and 1 at the boundary between the edge vicinity regions of the effective image and the other regions thereof, the intensity of the motion compensation process can continuously be varied at this area.

In this manner, the intensity of the motion compensation process is varied (reduced) for predetermined regions including edges of an effective image displayed on the display panel so that the image quality degradation can effectively be suppressed in the vicinity of the edges of the effective image, whereas the intensity of the motion compensation process is increased for the other regions to achieve an improved dynamic image quality.

Figure 11:
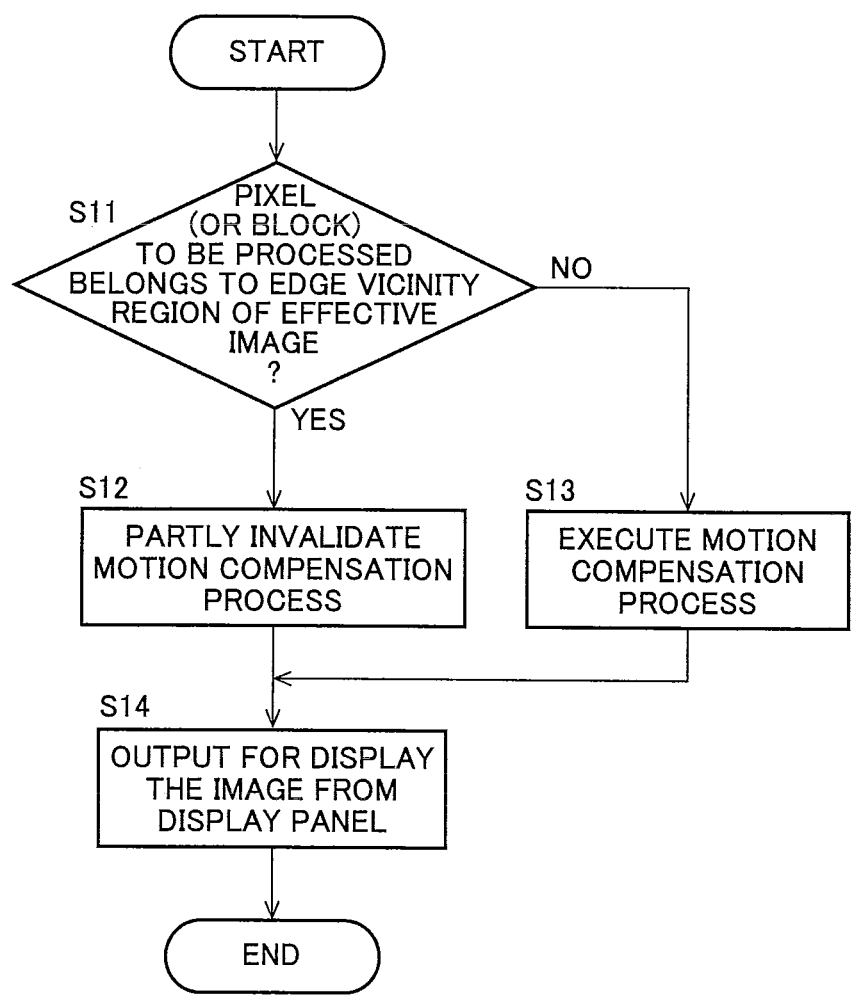
FIG. 11 is a flowchart for explaining an example of an image displaying method effected by the image displaying device of the present invention.

FIG. 11 is a flowchart for explaining an example of an image displaying method effected by the image displaying device of the present invention. An example of the image displaying method in the first and second embodiments will now be described. The image displaying device first determines whether a pixel (or a block) to be processed belongs to a predetermined region including top and bottom edges or right and left edges of an effective image displayed on the display panel (step S11), and, if determined to belong to this predetermined region (case of YES), then nullifies either or both of vertical and horizontal components of a motion vector or an interpolation vector to thereby invalidate the vertical and/or horizontal motion compensation processes of the FRC portion 10 (step S12).

If at step S11 the pixel (or the block) to be processed is determined to belong to regions other than the predetermined region including top and bottom edges or right and left edges of the effective image displayed on the display panel (case of NO), then the motion compensation process of the FRC portion 10 is normally executed (step S13). The thus frame-frequency-converted image signal is output for display from the display panel (step S14).

Figure 12:
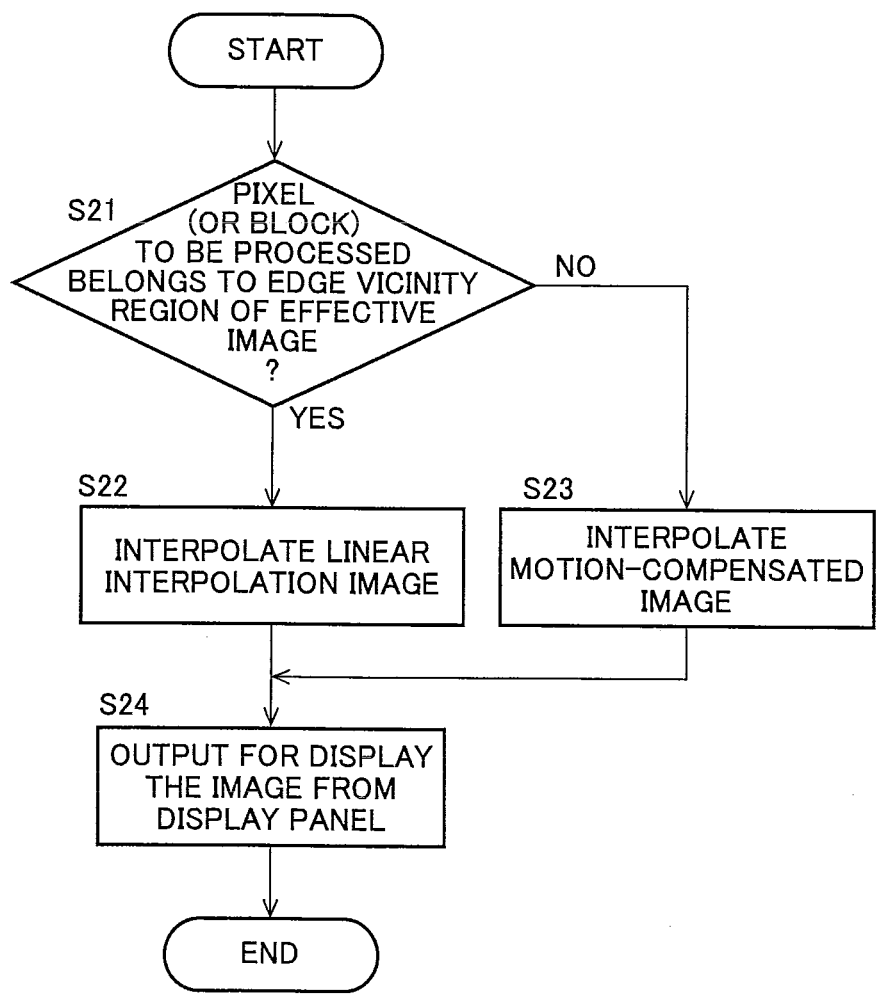
FIG. 12 is a flowchart for explaining another example of the image displaying method effected by the image displaying device of the present invention.

FIG. 12 is a flowchart for explaining another example of the image displaying method effected by the image displaying device of the present invention. An example of the image displaying method in the third embodiment will now be described. The image displaying device first determines whether a pixel (or a block) to be processed belongs to a predetermined region including top and bottom edges or right and left edges of an effective image displayed on the display panel (step S21), and, if determined to belong to this predetermined region (case of YES), then outputs an image signal with a linear interpolation image interpolated therein to thereby partly impede the motion-compensated interpolation process executed by the FRC portion (step S22).

If at step S21 the pixel (or the block) to be processed is determined to belong to regions other than the predetermined region including top and bottom edges or right and left edges of the effective image displayed on the display panel (case of NO), then an image signal with a motion-compensated image interpolated by the FRC portion 10 is output (step S23). The thus frame-frequency-converted image signal is output for display from the display panel (step S24).

Figure 13:
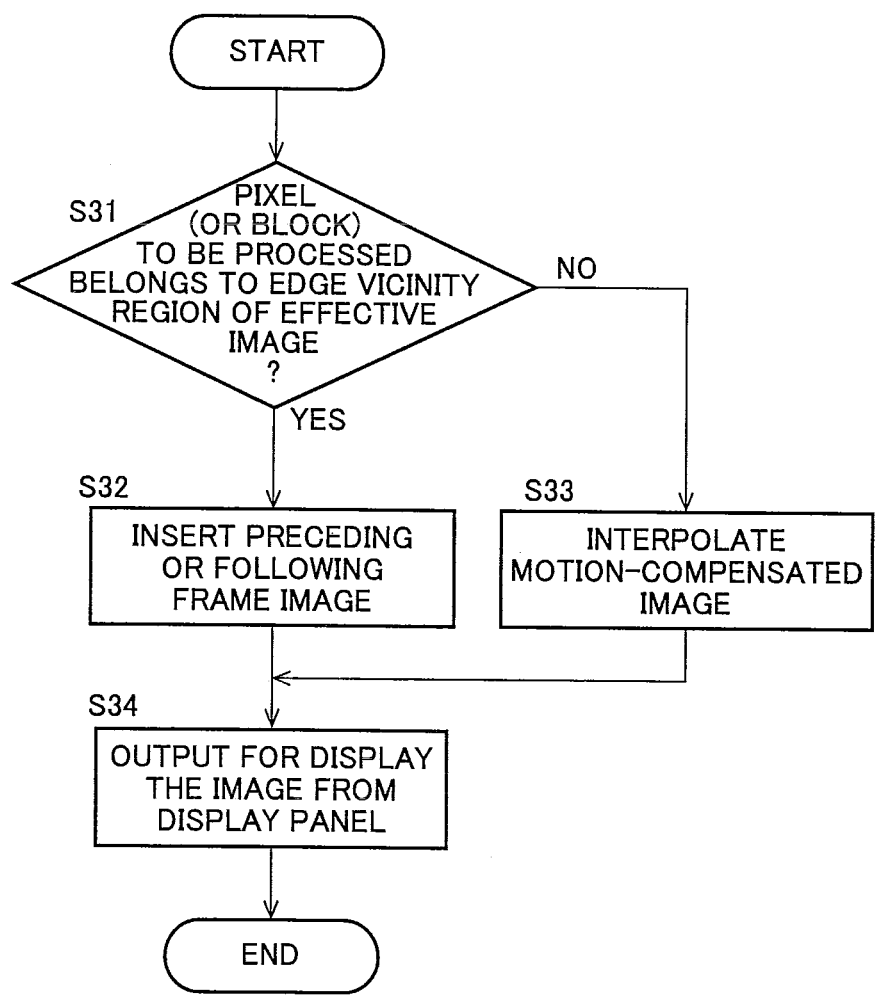
FIG. 13 is a flowchart for explaining a further example of the image displaying method effected by the image displaying device of the present invention.

FIG. 13 is a flowchart for explaining a further example of the image displaying method effected by the image displaying device of the present invention. An example of the image displaying method in the fourth embodiment will now be described. The image displaying device first determines whether a pixel (or a block) to be processed belongs to a predetermined region including top and bottom edges or right and left edges of an effective image displayed on the display panel (step S31), and, if determined to belong to this predetermined region (case of YES), then outputs an image signal with a preceding or following frame image inserted therein to thereby partly impede the motion-compensated interpolation process executed by the FRC portion (step S32).

If at step S31 the pixel (or the block) to be processed is determined to belong to regions other than the predetermined region including top and bottom edges or right and left edges of the effective image displayed on the display panel (case of NO), then an image signal with a motion-compensated image interpolated by the FRC portion 10 is output (step S33). The thus frame-frequency-converted image signal is output for display from the display panel (step S34).

Figure 14:
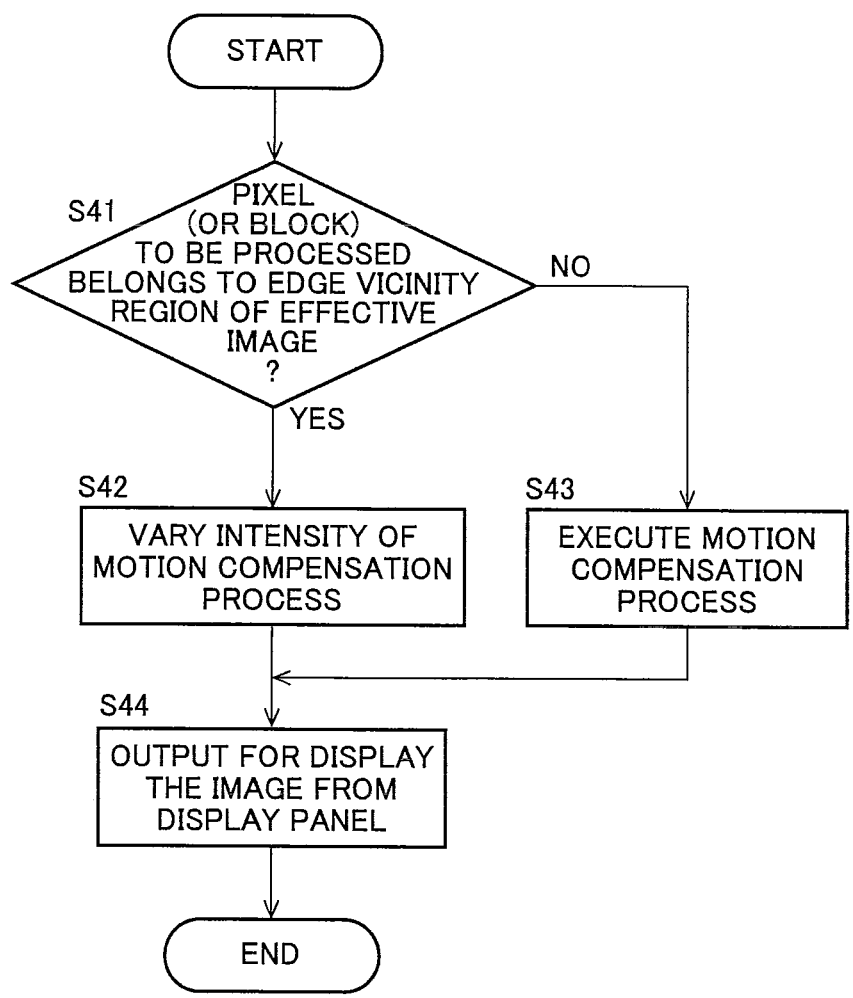
FIG. 14 is a flowchart for explaining a further example of the image displaying method effected by the image displaying device of the present invention.

FIG. 14 is a flowchart for explaining a further example of the image displaying method effected by the image displaying device of the present invention. An example of the image displaying method in the fifth embodiment will now be described. The image displaying device first determines whether a pixel (or a block) to be processed belongs to a predetermined region including top and bottom edges or right and left edges of an effective image displayed on the display panel (step S41), and, if determined to belong to this predetermined region (case of YES), then varies (reduces) the intensity of the motion compensation process in the FRC portion 10 (step S42).

If at step S41 the pixel (or the block) to be processed is determined to belong to regions other than the predetermined region including top and bottom edges or right and left edges of the effective image displayed on the display panel (case of NO), then the intensity of the motion compensation process in the FRC portion 10 is normally increased (step S43). The thus frame-frequency-converted image signal is output for display from the display panel (step S44).

As set forth hereinabove, according to the present invention, the vertical and/or horizontal motion compensation processes are not applied to the predetermined region including the top and bottom edges or the right and left edges of an effective image displayed on the display panel, whereas the motion compensation process is applied to the other regions for display output, enabling the image quality degradation in the vicinity of the edges of the effective image to effectively be suppressed.

Although in the above embodiments descriptions have been given of a case as a representative example where the present invention is applied to the liquid crystal display device using a liquid crystal display panel as the display panel, the present invention may be applied to a general image displaying device having hold-type display characteristics such as a liquid crystal display, an organic EL display, and an electrophoretic image display.

Although in the above descriptions the embodiments of the image processing device and method of the present invention have been described by way of example, these descriptions will also contribute to easy understanding of an image processing program for executing the present image processing method as a program by a computer and of a program recording medium in the form of a computer-readable recording medium having the image processing program stored thereon.

Although in the above embodiments descriptions have been given of a form where the image processing device of the present invention is integrally provided within the image displaying device, the image processing device of the present invention is not limited thereto, but it may naturally be disposed within video output equipment such as various recording media reproducing devices.

The invention claimed is:

1. An image displaying device, comprising:
   a rate converter that interpolates an image signal subjected to a motion compensation process between frames or between fields of an input image signal to convert the number of frames or the number of fields of the input image signal for output to a display panel,
   the rate converter generating an interpolation image not subjected to the motion compensation process for a predetermined edge region of a display screen adjacent to edges including the edges on the left, right, top and bottom of the display screen for an image signal to be displayed on the display panel including edges of an effective image displayed on the display panel,
   the rate converter generating an interpolation image subjected to the motion compensation process for regions other than the predetermined region, the rate converter including:
   a motion vector detecting portion that detects as vector information a motion of an image between consecutive frames or fields contained in the input image signal;
   an interpolation vector allocating portion that allocates an interpolation vector between the frames or between the fields, based on the detected motion vector information;
   an interpolation image generating portion that generates an interpolation image signal from the input image signal, using the allocated interpolation vector; and
   an image interpolating portion that interpolates the generated interpolation image signal between the frames or between the fields, wherein
   the image displaying device invalidates the motion compensation process in either or both of horizontal and vertical directions for the predetermined region by fixing at 0 either or both of horizontal and vertical components of a motion vector in the predetermined region detected by the motion vector detecting portion, and the predetermined region is a region whose width from edges of the effective image is equal to or less than the maximum motion vector length detectable by the motion vector detecting portion.

2. An image displaying device, comprising:

a rate converter that interpolates an image signal subjected to a motion compensation process between frames or between fields of an input image signal to convert the number of frames or the number of fields of the input image signal for output to a display panel, wherein for a predetermined region including edges of an effective image displayed on the display panel, the rate converter reducing the intensity of the motion compensation process, as compared with regions other than the predetermined region, the rate converter comprises an interpolation image generating circuit that generates an interpolation image signal by weighted-adding at a predetermined ratio an image signal subjected to the motion compensation process and an image signal subjected to a linear interpolation process, and for the predetermined region including edges of the effective image displayed on the display panel, the image displaying device increases the weighted-addition ratio of the image signal subjected to the linear interpolation process.

3. The image displaying device as defined in claim 2, wherein for the predetermined region including edges of the effective image displayed on the display panel, the interpolation image generating portion uses the image signal subjected to the linear interpolation process as the interpolation image signal, and wherein for the other regions, the interpolation image generating portion uses the image signal subjected to the motion compensation process as the interpolation image signal.

4. The image displaying device as defined in claim 2, wherein the predetermined region varies depending on a feature amount on the magnitude of a motion of the input image signal.

5. The image displaying device as defined in claim 2, wherein the predetermined region is externally variably set.

6. An image displaying method, comprising:

interpolating an image signal subjected to a motion compensation process between frames or between fields of an input image signal to convert the number of frames or the number of fields of the input image signal for output to a display panel, wherein for a predetermined region including edges of an effective image displayed on the display panel, the intensity of the motion compensation process is reduced as compared with regions other than the predetermined region;

generating an interpolation image signal by weighted-adding at a predetermined ratio an image signal subjected to the motion compensation process and an image signal subjected to a linear interpolation process; and increasing the weighted-addition ratio of the image signal subjected to the linear interpolation process for the predetermined region including edges of the effective image displayed on the display panel.

7. An image processing device, comprising:

a rate converter that interpolates an image signal subjected to a motion compensation process between frames or between fields of an input image signal to convert the number of frames or the number of fields of the input image signal, wherein for a predetermined region including edges in an effective image region of the input image signal, the rate converter reducing the intensity of the motion compensation process, as compared with the other regions, the rate converter comprises an interpolation image generating circuit that generates an interpolation image signal by weighted-adding at a predetermined ratio an image signal subjected to the motion compensation process and an image signal subjected to a linear interpolation process, and for the predetermined region including edges of the effective image region of the input image signal, the image displaying device increases the weighted-addition ratio of the image signal subjected to the linear interpolation process.

8. An image processing method, comprising:

interpolating an image signal subjected to a motion compensation process between frames or between fields of an input image signal to convert the number of frames or the number of fields of the input image signal, wherein for a predetermined region including edges in an effective image region of the input image signal, the intensity of the motion compensation process is reduced as compared with the other regions;

generating an interpolation image signal by weighted-adding at a predetermined ratio an image signal subjected to the motion compensation process and an image signal subjected to a linear interpolation process; and increasing the weighted-addition ratio of the image signal subjected to the linear interpolation process for the predetermined region including edges of the effective image region displayed on the display panel.

* * * * *